United States Patent [19]
Takeuchi et al.

[11] Patent Number: 5,517,369
[45] Date of Patent: May 14, 1996

[54] MULTI-TRACK MAGNETIC SIGNAL REPRODUCING APPARATUS

[75] Inventors: Hitoshi Takeuchi, Kitakatsuragi; Eiji Yamada, Tenri; Chiaki Yamawaki, Habikino; Tetsuo Iwaki, Yamatokoriyama, all of Japan

[73] Assignee: Sharp Kabushiki Kaisha, Osaka, Japan

[21] Appl. No.: 348,161

[22] Filed: Nov. 28, 1994

Related U.S. Application Data

[63] Continuation of Ser. No. 137,470, Oct. 18, 1993, abandoned.

[30] Foreign Application Priority Data

Oct. 19, 1992 [JP] Japan .................... 4-280043

[51] Int. Cl.$^6$ .................................. G11B 5/035
[52] U.S. Cl. ........................................... 360/65
[58] Field of Search ............................ 360/113, 118, 360/46, 51, 53, 77.05, 77.04, 77.08, 32

[56] References Cited

U.S. PATENT DOCUMENTS

| | | | |
|---|---|---|---|
| 4,040,113 | 8/1977 | Gorter | 360/113 |
| 4,280,158 | 7/1981 | de Niet | 360/113 |
| 4,433,424 | 2/1984 | Taber et al. | 375/106 |
| 4,620,243 | 10/1986 | Bakken et al. | 360/77 |
| 4,789,838 | 12/1988 | Cheng | 388/150 |
| 4,903,151 | 2/1990 | Mizukami et al. | 360/61 X |
| 5,185,681 | 2/1993 | Volz et al. | 360/77.05 |
| 5,220,466 | 6/1993 | Coker et al. | 360/46 |
| 5,233,482 | 8/1993 | Galbraith et al. | 360/46 |
| 5,323,278 | 6/1994 | Contreras et al. | 360/67 |

FOREIGN PATENT DOCUMENTS

| | | | |
|---|---|---|---|
| 61-148607 | 7/1986 | Japan | 360/45 |
| 61-148610 | 7/1986 | Japan | 360/45 |
| 62-89204 | 4/1987 | Japan | 360/45 |
| 62-95705 | 5/1987 | Japan | 360/45 |

*Primary Examiner*—Donald T. Hajec
*Assistant Examiner*—Thien Minh Le
*Attorney, Agent, or Firm*—Nixon & Vanderhye

[57] ABSTRACT

In a multi-track magnetic signal reproducing apparatus, a plurality of MR heads including MR (Magneto Resistance Effect) elements are provided correspondingly to tracks on a magnetic tape. At the time of reproduction, constant current from a constant current power supply is sequentially supplied as pulse-shaped current for detecting a signal to each MR element by a switching operation by switch in response to a prescribed clock signal, and output voltage from each MR element related to reproduction of a magnetic signal on a corresponding track is sequentially provided to one input side of a differential amplifier. In differential amplifier, the offset voltage of each MR element provided to the other input side and the above-described output voltage are differentially amplified and only voltage due to the reproducing magnetic signal of each track is accurately extracted. Accordingly, the supply of pulse-shaped current effectively suppresses increase in the amount of consumption current regardless of the number of tracks on the tape (or the number of heads), and since amplifier is shared between the tracks, the number of necessary terminals for such a multi-track MR head is reduced.

27 Claims, 10 Drawing Sheets

| N | CONVENTIONAL EXAMPLE 1 | | CONVENTIONAL EXAMPLE 2 | | EMBODIMENTS | | | |
|---|---|---|---|---|---|---|---|---|
| | | | | | $H_1$ | | $H_2$ | |
| | HEAD | IC | HEAD | IC | HEAD | IC | HEAD | IC |
| 4 | 5 | $12+\alpha$ | 5 | $8+\alpha$ | 5 | $7+\alpha$ | 4 | $5+\alpha$ |
| 8 | 9 | $24+\alpha$ | 9 | $16+\alpha$ | 9 | $11+\alpha$ | 4 | $5+\alpha$ |
| 16 | 17 | $48+\alpha$ | 17 | $32+\alpha$ | 17 | $19+\alpha$ | 4 | $5+\alpha$ |

MULTI-TRACK MAGNETIC SIGNAL REPRODUCING APPARATUS

This is a continuation of patent application Ser. No. 08/137,470, filed Oct. 18, 1993, now abandoned.

BACKGROUND OF THE INVENTION

1. Field of the Invention

The present invention relates to multi-track magnetic signal reproducing apparatuses using a multi-track magneto resistance effect (hereinafter referred to as MR) head.

2. Description of the Background Art

When an MR head is brought into contact with a running recorded magnetic tape, the resistivity of an MR element built in the MR head changes in response to a magnetic field from the magnetic tape. The MR head reproduces a signal recorded on the magnetic tape taking advantage of this change.

The operation principles of the MR head will be described in conjunction with FIGS. 8 and 9. In FIG. 8, a constant current power supply 1 is connected to an MR element (indicated by MR in the figures) 2. When a bias magnetic field is applied to MR element 2, resistance R slightly changes in proportion to —H, where H represents the intensity of the magnetic field from the magnetic tape and R represents the resistance of MR element 2. When a constant current I is passed across MR element 2 with constant current power supply 1, voltage V at a terminal d is $V=R*I$. Resistance R slightly changes in proportion to the intensity H of the magnetic field, and voltage V slightly changes accordingly. Therefore, the magnetic signal recorded on the magnetic tape can be reproduced using the change $\Delta V$ in voltage at terminal d. When only a bias magnetic field is applied to MR element 2, the resistance of MR element 2 is $R_0$ and voltage at terminal d is $V_0$ ($=R_0*I$) for the intensity H of the magnetic field from the magnetic tape being 0, an output voltage $V_{out}$ by a reproducing signal is represented as $\Delta V$ ($=V-V_0$) produced by excluding voltage $V_0$ (offset voltage) from detected voltage V at terminal d. When voltage V at terminal d is amplified, output voltage $V_{out}$ by a very small reproducing signal included therein is amplified, and offset voltage $V_0$ is amplified as well. Accordingly, reproducing processing with high accuracy cannot be made because of offset voltage $V_0$.

FIG. 9 illustrates one example of a blocking arrangement for amplifying only output voltage $V_{out}$ by the reproducing signal exclusive of offset voltage $V_0$ described in conjunction with FIG. 8. In FIG. 9, in addition to constant current power supply 1 and MR element 2 shown in FIG. 8, a capacitor 15 and an amplifier 16 are further included. Amplifier 16 amplifies output voltage $V_{out}$ provided based on the amount of gain of as much as 60 dB, for example, for output to a terminal e. Voltage $V_{out}$ is in the range from several ten $\mu V_{P-P}$ to several hundred $\mu V_{P-P}$, and therefore the voltage reaches to a range from several ten $mV_{P-P}$ to several hundred $mV_{P-P}$ after amplification by amplifier 16. According to 8/10 modulation system by which a bit rate per one channel (one recording track on a tape) is 96 k bit/sec and 8-bit data is converted into data of 10 bits to be recorded on a tape, a reproducing frequency having the shortest recording wavelength is 48 kHz. Generally, a reproducing frequency at least 1/100 of 48 kHz, in other words at least 480 Hz will be necessary. Therefore, when the value of resistance R of MR element 2 is set to 100Ω, and a cut off frequency to 480 Hz, capacitor 15 will have a capacitance of about 3.3 μF, which is relatively large for a capacitor.

The multi-track MR head system has a plurality of such MR heads arranged widthwise of a magnetic tape, with the MR heads provided individually corresponding to a plurality of tracks arranged widthwise of the magnetic tape, and a magnetic signal on each track is simultaneously reproduced by a corresponding MR head. For example, for N tracks provided on a magnetic tape, the multi-track MR head system includes at least N MR heads.

FIG. 10 is a block diagram showing a multi-track magnetic signal reproducing apparatus using a multi-track MR head in Conventional Example 1. The apparatus includes constant current power supplies 1-1 to 1-N, MR elements 2-1 to 2-N, an A/D (Analog/Digital) converter 5, a waveform equalizing circuit 9, a data detection circuit 10, an RAM (Random Access Memory) 11, a signal processing circuit 12, capacitors 15-1 to 15-N, amplifiers 16-1 to 16-N, a counter 17 and an N-input multiplexer 18. A magnetic tape has a plurality of tracks, and a magnetic signal recorded on each track is reproduced by the output voltage of an MR element provided corresponding to each track. The output voltage of MR element 2-j provided corresponding to the j-th track (for j=1, 2, 3, . . . , N), for example, has its DC (Direct Current) component cut by capacitor 15-j, then amplified to a prescribed level by amplifier 16-j and then provided to multiplexer 18. Counter 17 controls multiplexer 18 to sequentially select one of the N inputs and conducts a selected one to the output side, while counting from 1 to N. Accordingly, N outputs from all these amplifiers are subjected to parallel-serial conversion and provided to A/D converter 5. A/D converter 5, waveform equalizing circuit 9 and data detection circuit 10 process signals for N tracks in a time-dividing manner. More specifically, A/D converter 5 quantizes and produces a discrete reproducing signal for each track, and provides a resultant digital signal to waveform equalizing circuit 9, waveform equalizing circuit 9 in turn removes the input intersymbol interference of digital signal with code for application to data detection circuit 10, and data detection circuit 10 converts the digital signal into a binary value of 0 and 1 by zero cross determination or the like and has the resultant data written and recorded in RAM 11. Signal processing circuit 12 reads out digital information recorded in RAM 11, performs processings such as modulation and error correction, and then externally outputs the information from terminal a. Conventional Example 1 requires N capacitors for removing DC component.

Note that information recorded on a magnetic tape includes an audio sound, a still picture, a motion picture and sentences.

In FIG. 10, portion H surrounded by the dotted line is a multi-track MR head. For the terminals of the multi-track MR head, N terminals connected to current power supplies and capacitors and each for outputting a magnetic signal detected by each MR element, and a ground terminal are provided. Accordingly, the number of terminals of the multi-track MR head should be N+1 in total.

When the current power supplies and the amplifiers are manufactured into an IC (Integrated Circuit), for terminals for the IC, the input terminal of each amplifier, the output terminal of each amplifier, the current supply terminal of each current power supply, a power supply terminal, a ground terminal and the like will be necessary. For the number of terminals α for such as the power supply terminal and the ground terminal, the number of terminals for the IC will be 3N+α in total.

The above-described approach passes constant current across the MR elements, but an approach of passing pulse current is known (IBM Technical Disclosure Bulletin Vol. 19 No. 8 January 1977, pp. 3222–3223).

According to this approach, output voltage obtained at the time of passing pulse current is A/D converted to provide a reproducing signal. Also in this approach, output voltage by a reproducing signal equivalent to the case of passing constant current is obtained, and power consumption can be reduced, because current is passed only when the pulse current is supplied. Passing pulse current several times as large at a level as the constant current provides output voltage at a level several times as large.

In Conventional Example 1 shown in FIG. 10, constant current flowing across the MR elements in total is N times as large, because the number of tracks is N times as large, which increases power consumption by the amount. A multi-track type magnetic signal reproducing apparatus by which the total amount of current flowing across MR elements does not increase even the number of tracks is N times as large when the above-described approach of passing pulse current across each MR element is employed (see Japanese Patent Laying-Open No. 61-148610). This approach of passing pulse current across each MR element is referred to as Conventional Example 2, and FIG. 11 illustrates a block arrangement of Conventional Example 2.

In FIG. 11, the apparatus includes MR elements 2-1 to 2-N, a switch 3, an A/D converter 5, a waveform equalizing circuit 9, a data detection circuit 10, an RAM 11, a signal processing circuit 12, an MR driver circuit 13, a pulse generator 14, amplifiers 16-1 to 16-N, a counter 17 sequentially counting from 1 to N, and an N-input multiplexer 18. A pulse signal generated by pulse generator 14 is supplied to MR driver circuit 13, and functions to cause MR driver circuit 13 to output pulse current. The output pulse current is sequentially switched by switch 3, and sequentially applied to MR elements 2-1 to 2-N, and voltage output from each MR element in response is amplified by a corresponding one of amplifiers 16-1 to 16-N, and is applied to N-input multiplexer 18 in parallel. Counter 17 inputs the pulse signal of pulse generator 14, and in response counts, and controls multiplexer 18 to sequentially select one of N inputs for output to A/D converter 5 in synchronization with the switching operation of switch 3. A/D converter 5 inputs the output signal of each MR element from multiplexer 18, and A/D converts the input signal after the signal transits to a steady state, and applies the converted signal to waveform equalizing circuit 9. The signal processing after waveform equalizing circuit 9 is the same as the case in Conventional Example 1 illustrated in FIG. 10, and therefore a description thereof is omitted.

Herein, for the terminals of the multi-track MR heads in the portion H surrounded by the dotted line in FIG. 11, N+1 in total including N terminals connected to switch 3 and amplifiers 16-1 to 16-N for outputting voltages by magnetic signals detected by the MR elements and a ground terminal will be necessary. When MR driver circuit 13, pulse generator 14, switch 3 and amplifiers 16-1 to 16-N are manufactured into an IC, for the number of terminals for the IC, a terminal which functions for supplying current to each MR element via switch 3 and as an input for each amplifier, the output terminal of each amplifier, a power supply terminal, a ground terminal and the like will be necessary. For the number terminals such as the power supply terminal and the ground terminal being $\alpha$, the number of terminals for the IC in this case will be $2N+\alpha$ in total.

In Conventional example 2 illustrated in FIG. 11, when each amplifier amplifies voltage $V_{out}$ output by a corresponding MR element, offset voltage $V_0$ included therein is simultaneously amplified. Offset voltage $V_0$ is for example as large as several hundred mV, and therefore the gain of the amplifier cannot be increased. Accordingly, removal of offset voltage $V_0$ in a preceding stage to the amplifier may be possible, but since pulse current rather than constant current is passed across each MR element, provision of a capacitor for cutting DC component in a preceding stage to the amplifier as in the case of Conventional Example 1 cannot remove offset voltage $V_0$. Therefore, implementation of signal processing after the amplifier is very difficult.

Also in Conventional Example 2 in FIG. 11, since each amplifier must amplify an output voltage $V_{out}$ having pulse wave, as many as N amplifiers responding at a high speed in time with a short pulse width must be used, which pushes up the cost.

Furthermore, in Conventional Examples 1 and 2, as many as N+1 terminals are necessary for the multi-track MR head surrounded by the dotted line H, particularly in Conventional Example 1, when N current power supplies and N amplifiers are manufactured into an IC, N capacitors must inevitably be attached externally, which requires at least 3N or 2N terminals for the IC, resulting in difficulty in packaging of the IC. Accordingly, the connection between the multi-track MR head and the amplifiers is complicated, and therefore the multi-track magnetic signal reproducing apparatus cannot be manufactured inexpensively.

SUMMARY OF THE INVENTION

It is an object of the invention to provide a multi-track magnetic signal reproducing apparatus capable of extracting a reproduced magnetic signal component from an output signal from each MR head with a high accuracy utilizing a simple signal processing circuit.

Another object of the invention is to provide a multi-track magnetic signal reproducing apparatus permitting reduction of cost associated with the manufacture of the apparatus.

Yet another object of the invention is to provide a multi-track magnetic signal reproducing apparatus capable of effectively restraining rapid increase of the amount of current supply to MR heads associated with increase of the number of heads.

In order to achieve the above-described objects, a multi-track magnetic signal reproducing apparatus according to the invention includes a plurality of MR heads including MR elements provided correspondingly to a plurality of tracks on a recording medium, a current supply portion, an offset voltage signal generation portion, and a magnetic signal component extraction portion.

At the time of reproducing a magnetic signal, the current supply portion supplies current to each MR element, the offset voltage signal generation portion generates an offset voltage signal to be output from each MR element in response to the supply of the current and applies the generated signal to the magnetic signal component extraction portion. The magnetic signal component extraction portion operates to extract a magnetic signal component reproduced from each track based on an output voltage signal from each MR element in response to the supply of the current by the current supply portion and the offset voltage signal of each MR element generated by and applied from the offset voltage signal generation portion. Accordingly, the provision of a single magnetic signal component extraction portion in place of a plurality of capacitors provided individually corresponding to MR elements for offset voltage signal removal permits extraction of only a voltage signal by a magnetic signal from a voltage signal output from each MR element, in other words from a voltage signal including a voltage signal from an offset voltage signal and a voltage signal by a magnetic signal, so that highly accurate magnetic signal reproducing is achieved.

Since a plurality of MR elements and a control portion for the current supply portion are formed on the same substrate and capacitors are removed, connection between one current supply portion and one magnetic signal component extraction portion shared among all the MR heads is extremely easy, so that reduction of cost associated with the manufacture of the apparatus can be achieved.

Furthermore, since pulse current is supplied to each MR element, rapid increase in the amount of current supplied from the current supply portion can effectively be suppressed even if the number of heads increases.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Now, embodiments of the present invention will be described in detail in conjunction with the accompanying drawings.

Figure 1:
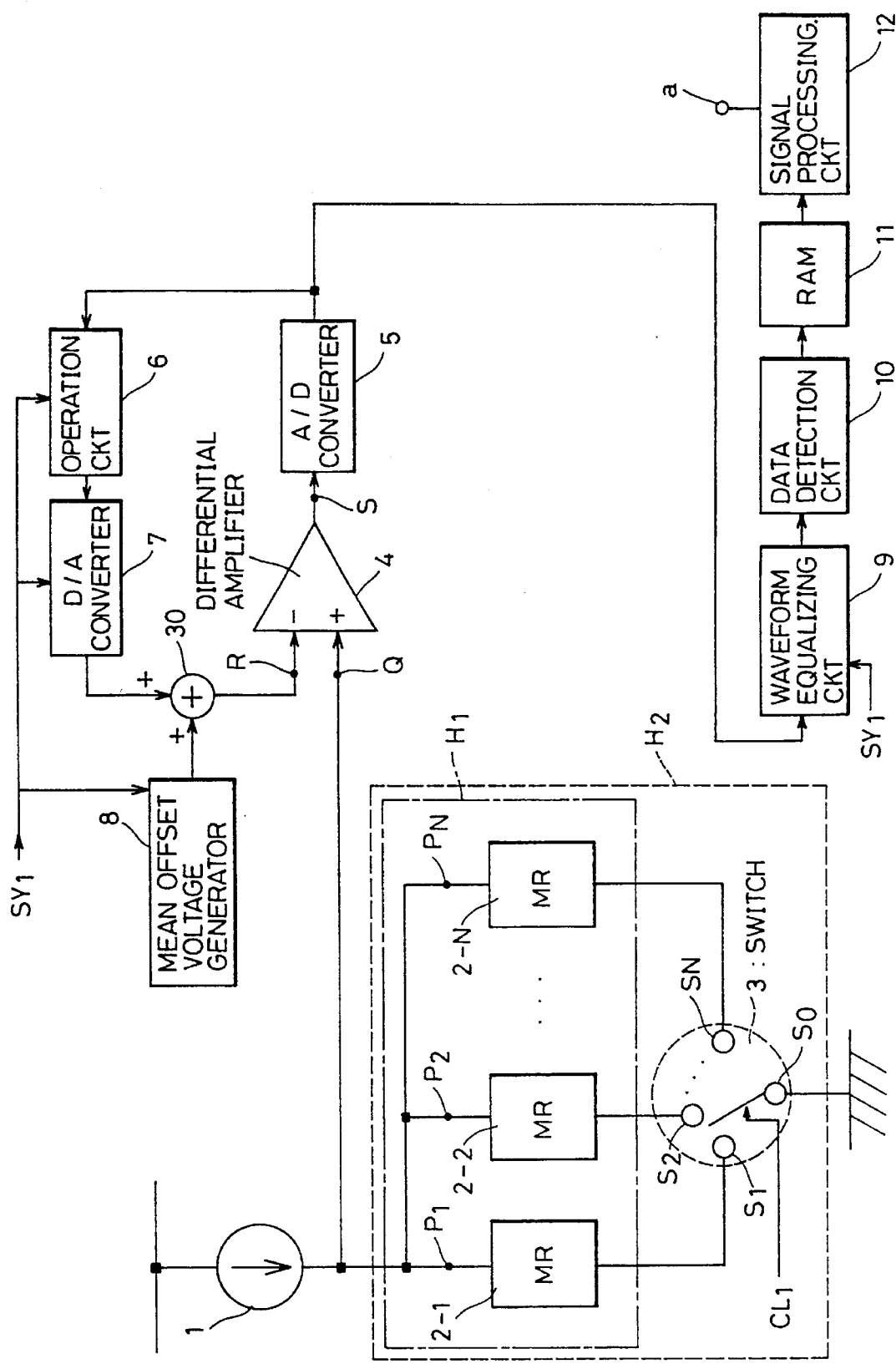
FIG. 1 is a block diagram showing a multi-track magnetic signal reproducing apparatus according to a first embodiment of the invention.

FIG. 1 is a block diagram showing a multi-track magnetic signal reproducing apparatus according to a first embodiment of the invention. In FIG. 1, the apparatus includes a constant current power supply 1, MR elements 21 to 2-N, a switch 3, a differential amplifier 4, an A/D converter 5, an operation circuit 6, a D/A converter 7, a mean offset voltage generator 8, a waveform equalizing circuit 9, a data detection circuit 10, an RAM 11, a signal processing circuit 12, and an addition circuit 30.

Since switch 3 includes a terminal S0 connected to the ground side and terminals S1–SN connected to the side of MR elements, is switched in response to a clock signal CL1 in a prescribed cycle output by a clock generator (not shown), and sequentially switches connection of terminals S1–SN to terminal S0, constant current supplied from constant current power supply 1 is sequentially applied to MR elements 2-1 to 2-N in the form of pulse current. In order to operate MR elements 2-1 to 2-N supplied with current in synchronization with the other circuits (differential amplifier 4, A/D converter 5, operation circuit 6, D/A converter 7, mean offset voltage generator 8, waveform equalizing circuit 9 and the like), each of these other circuits is provided with a synchronization signal SY1 in synchronization with the above-described clock signal CL1. For example, in synchronization with a rising of the clock signal, the portion to which current is supplied is switched from the presently selected MR element to the next MR element. In response to N risings of clock signal CL1, N MR elements can sequentially be selected, and this operation continues to be repeated. Synchronizing signal SY1 attains a high level during the period from the j-th rising of clock signal CL1 among the N risings of clock signal CL1 to the next j+1-th rising. MR element 2-j is selected when synchronizing signal SY1 is at the high level. Thus, a timing for sequentially selectively switching between the MR elements in a prescribed order matches a timing for time-dividing processing of the circuits other than the MR elements, and therefore a track on the magnetic tape processed by an MR element can be matched with a track to be processed by the other circuits.

Figure 2:
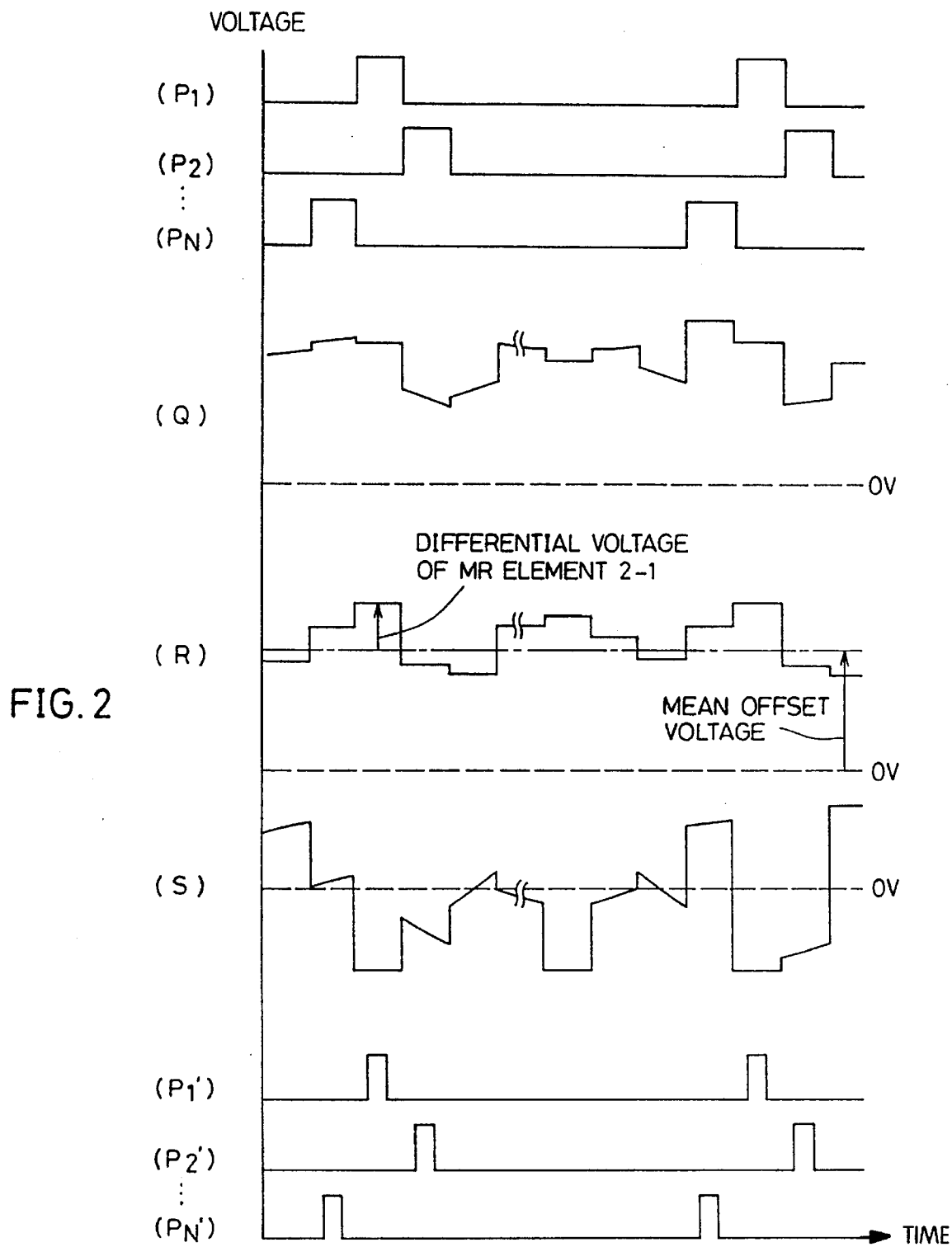
FIG. 2 is a waveform chart showing current or voltage in each portion of the multi-track magnetic signal reproducing apparatus according to the embodiment of the invention.

FIG. 2 illustrates the waveform of current or voltage at each node in the multi-track magnetic reproducing apparatus shown in FIG. 1 or FIG. 5 which will be described later, in which $(P_1)-(P_N)$ represent pulse current waveforms at nodes $P_1-P_N$ in FIG. 1. The output voltages of MR elements 2-1 to 2-N are serially input to the +side (non-inverting input side) of differential amplifier 4. FIG. 2 at (Q) shows the output voltage waveform of the MR elements at node Q in FIG. 1. Operation circuit 6 as will be described later stores differential voltage values, difference between an offset voltage value and a mean offset voltage value for each MR element. Operation circuit 6 serially outputs the differential voltage value for each MR element to D/A converter 7. D/A converter 7 converts the applied differential voltage value into differential voltage for application to addition circuit 30. The mean offset voltage generated by mean offset voltage generator 8 is also applied to addition circuit 30, and therefore an offset voltage produced by adding the mean offset voltage and the differential voltage is obtained at addition circuit 30, which is input to the side (inverting input side) of differential amplifier 4. FIG. 2 at (R) illustrates the offset voltage waveform of the output of addition circuit 30 at node R in FIG. 1. Differential amplifier 4 amplifies the difference between the output voltage of an MR element and the offset voltage, in other words, amplifier 4 amplifies only voltage by a magnetic signal recorded on the magnetic tape. Magnetic signal voltage amplified for each MR element is serially input to A/D converter 5. FIG. 2 at (S) illustrates an amplified magnetic signal voltage waveform at node S in FIG. 1. A/D converter 5, waveform equalizing circuit 9 and data detection circuit 10 perform signal processing for N tracks in a time dividing manner. A/D converter 5 performs A/D conversion after the signal output of an MR element attains a steady state, and performs quantizing and discreting of a reproducing signal for each track. The reproducing signal converted into a digital value at A/D converter 5 is removed of interference with code by waveform equalizing circuit 9, then converted into a binary value of 0 and 1 by zero cross determination or the like at data determination circuit 10, and written to be stored in RAM 11. Signal processing circuit 12 reads out data stored in RAM 11, performs processings such as modulation and error correction, and externally outputs information produced from the magnetic tape through terminal a.

Note that the signal of the digital value representing the output of A/D converter 5 is also applied to operation circuit 6, a detail of which will be described later.

Figure 3:
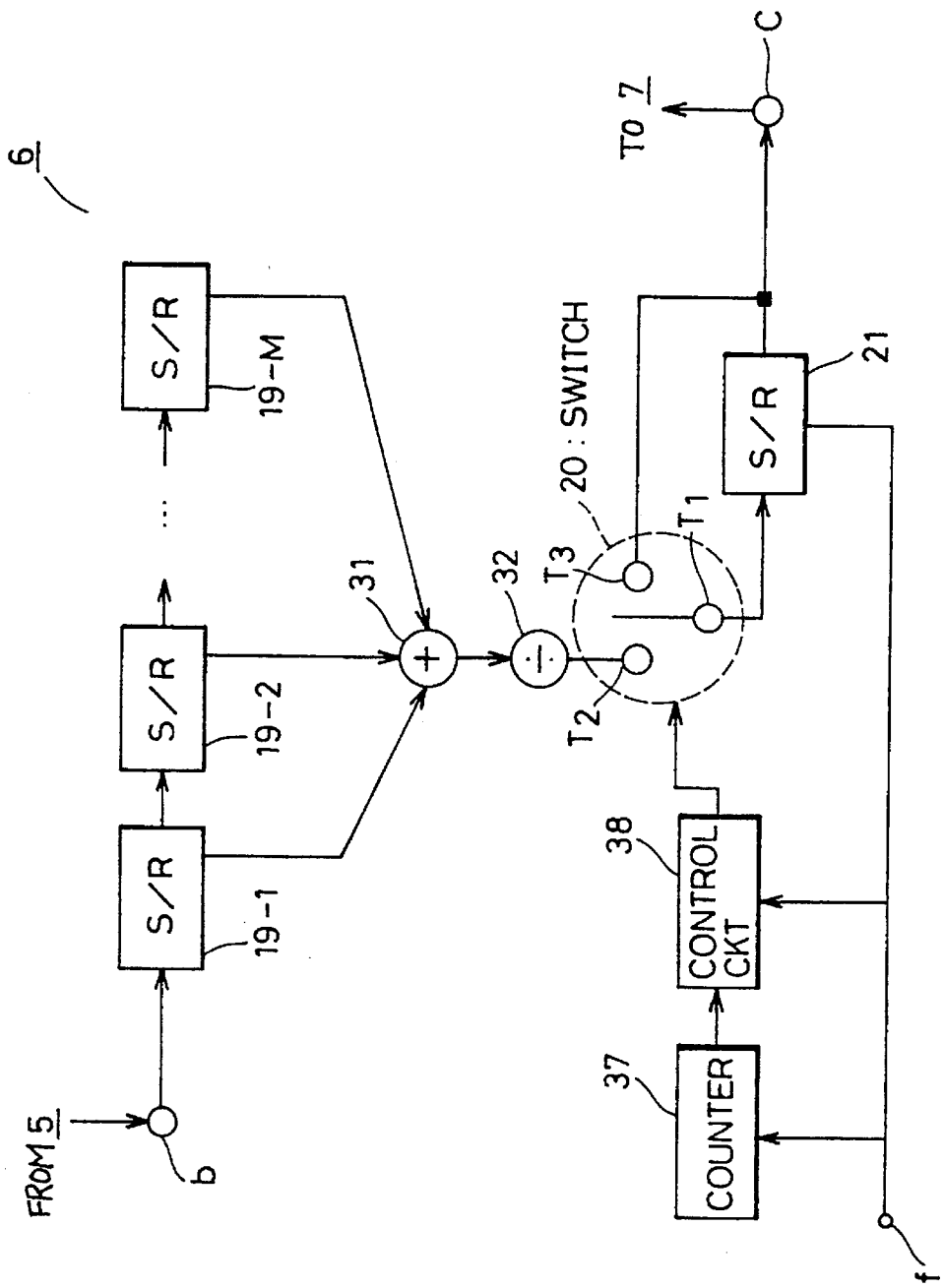
FIG. 3 is a block arrangement of an operation circuit according to the embodiment of the invention.

FIG. 3 is a diagram showing one example of the block arrangement of operation circuit 6 shown in FIG. 1. In FIG. 3, operation circuit 6 includes N-stage shift registers (abbreviated as S/R in the figures) 19-1 to 19M, a switch 20, an N-stage shift register (abbreviated as S/R in the figure) 21, an addition circuit 31, a division circuit 32, a counter 37, and a control circuit 38. Switch 20 includes signal input terminals T2 and T3, and a signal output terminal T1, and switches its input side in response to a control signal from control circuit 38.

When a reset signal indicating initiation of an initializing operation is input in operation circuit 6 from a terminal f, in response N-stage shift register 21, counter 37, and control circuit 38 are reset. Counter 37 starts counting immediately after the resetting, sequentially counts up to at least N*(M+1), and sequentially outputs the count value to control circuit 38. Control circuit 38 inputs the reset signal and the count value output from counter 37, and outputs a control signal for switching switch 20. Control signal 38 controls switch 20 to switch to the side of input terminal T3 in response to input of the reset signal, and sets values to circulate within N-stage shift register 21. Thereafter, when the count value reaches N*M, control circuit 38 switches switch 20 to the side of terminal T2. When the count value reaches N*(M+1), switch 20 is once again switched to terminal T3 side, and values are set to circulate within shift register 21. Control circuit 38 then maintains the state of switch 20 until the next reset signal is input.

Now, initialization of Operation circuit 6 will be described. An initialization is performed when the power supply of the multi-track magnetic signal reproducing apparatus is turned on or the system is reset and the magnetic tape is not run. As described above, switch 20 is switched to the side of terminal T3 with N-stage shift register 21 being reset to value 0, and therefore a differential voltage value is set 0 for output from terminal c in parallel with the value circulating inside register 21 to maintain the differential voltage value=0. The output of register 21 becomes the output of operation circuit 6 at terminal c and is input into converter 7 in FIG. 1. Thus, only the mean offset voltage value of the output of mean offset voltage generator 8 is input to the −side of differential amplifier 4 through converter 7, addition circuit 30 and mean offset voltage generator 8 in FIG. 1. In FIG. 1, at the time of the initialization, differential amplifier 4 attempts to amplify voltage removed of the mean offset voltage from the output voltage of an MR element, but the voltage of the magnetic signal at the time is at value 0, because the magnetic tape is not running. Accordingly, differential amplifier 4 amplifies the difference between the offset voltage of the output of each MR element sequentially applied to the side and the mean offset voltage input to the −side, in other words the differential voltage for application to A/D converter 5. A/D converter 5 digitizes the applied differential voltage for output. The value of each digitized differential voltage is input to operation circuit 6 from terminal b in FIG. 3, and sequentially transferred to N-stage shift registers 19-1 to 19M. When all the differential voltage values associated with the outputs of N MR elements are input to each of shift registers 19-1 to 19M, in other words the count value of counter 37 reaches N*M, switch 20 is switched to the side of terminal T2. Then, the values of the N-th stages of respective registers 19-1 to 19M are read out, added up in addition circuit 31, and the resultant value of addition is divided by value M in division circuit 32 to produce the mean differential voltage value of the MR element corresponding to the first track. The differential voltage value is produced as the mean value for M such values in order to remove noise caused by thermal noise the resistance of an MR element has or the noise component of differential amplifier 4 itself. Therefore, M is preset to an appropriate value for removing the noise. Accordingly, N-stage shift registers 19-1 to 19-M, addition circuit 31 and division circuit 32 function as a filter for differential voltage values. The differential voltage value of MR elements 2-1 corresponding to the first track removed of the noise component is input into N-stage shift register 21. Then, registers 19-1 to 19-M each shift by one stage and the differential voltage value of MR element 2-2 corresponding to the second track is similarly calculated for removal of the noise component and input to N-stage shift register 21. Then, when shift register 21 shifts by N stages, in other words when the count value of counter 37 reaches N*(M+1), the differential voltage values of N MR elements 2-1 to 2-N corresponding to the first to N-th tracks will have been removed of noise components and sequentially input to shift register 21. Thus, when the count value reaches N*(M+1), control circuit 38 once again switches switch 20 to terminal T3 to enable the value to circulate within shift register 21 to complete the initialization operation.

Figure 4:
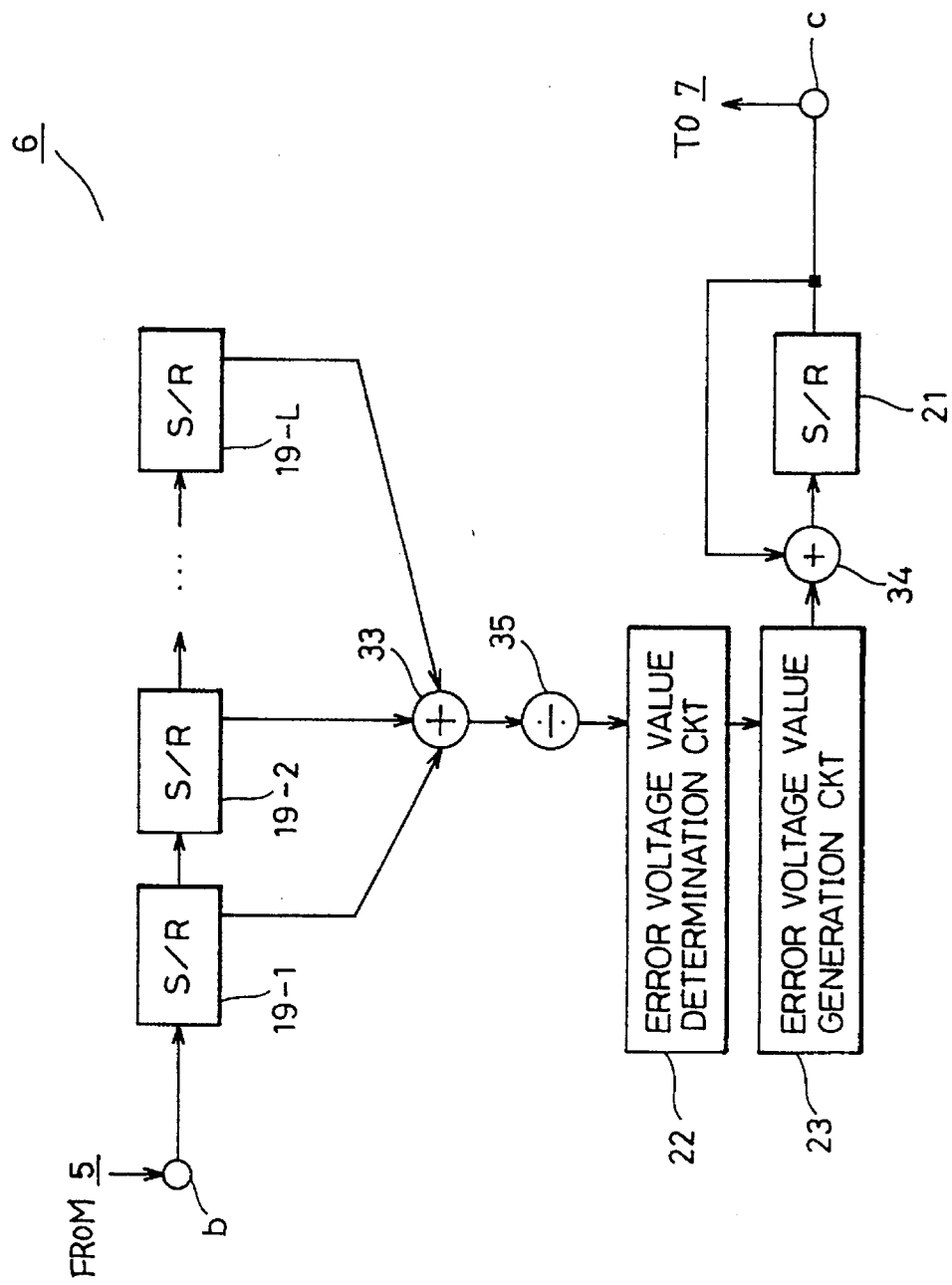
FIG. 4 is a diagram showing another example of the block arrangement of the operation circuit according to the embodiment of the invention.

FIG. 4 is a block diagram showing another example of the block arrangement of operation circuit 6 shown in FIG. 1. In FIG. 4, operation circuit 6 includes N-stage shift registers 19-1 to 19-L, an N-stage shift register 21, an error voltage value determination circuit 22, an error voltage value generation circuit 23, addition circuits 33 and 34, and a division circuit 35. Operation circuit 6 shown in FIG. 4 is particularly applied when a magnetic signal recorded on a magnetic tape is DC free (no DC component appears on its frequency spectrum in a modulation system). A magnetic signal becomes DC free when information is recorded on a magnetic tape according to a DC free modulation system (for example a 8/10 modulation system used for a Digital Audio Tape Recorder (DAT)).

In FIG. 4, the differential voltage values of the MR elements are stored in N-stage shift register 21, and the differential voltage values are sequentially read out from register 21, and output from terminal c as well as provided to addition circuit 34. Addition circuit 34 modifies the differential voltage value by adding the differential voltage value of each MR element output by register 21 and an error voltage value for the differential voltage value generated by error voltage value generation circuit 23, then applies the modified value to register 21 for storage therein, and therefore the differential voltage values of MR elements are sequentially modified and stored in register 21.

In FIG. 1, differential amplifier 4 amplifies a magnetic signal voltage removed of the offset voltage of the output of addition circuit 30 from the output voltage of each MR element. Assuming that a differential voltage value output from operation circuit 6 has an error, an offset voltage output by addition circuit 30 will contain an error, and therefore differential amplifier 4 will amplify the magnetic signal voltage and the error voltage portion in the differential voltage as well. The magnetic signal voltage value and the error voltage value of the differential voltage both digitized by A/D converter 5 are input to operation circuit 6 from terminal b in FIG. 4.

The digitized magnetic signal voltage value and the digitized error voltage value of the differential voltage value input from the terminal b of operation circuit 6 are sequentially transferred to N-stage shift registers 19-1 to 19-L. The values of the i-th (i=1, 2, 3, ..., N) stages of shift registers 19-1 to 19-L are read out at a time, added up at addition circuit 33, and the addition value is divided by value L at division circuit 35, so that a value is removed only of the magnetic signal voltage value from the input value from terminal b (value including the magnetic signal voltage value and the error voltage value of the differential voltage value) and can be provided to error voltage value determination circuit 22. More specifically, registers 19-1 to 19-L, addition circuit 33 and division circuit 35 constitute a lowpass filter, which enables only the magnetic signal to be removed from the input signal from terminal b. Accordingly, value L is a suitable value necessary for removing the magnetic signal from the input signal. Since N-stage shift register 21 stores a differential value in as a digital value, it cannot modify an error smaller than a minimum unit for the differential voltage value. Therefore, error voltage value determination circuit 22 and error voltage value generation circuit 23 are provided. Circuit 22 determines whether or not the error voltage value of a differential voltage value input from division circuit 35 is smaller than the minimum unit. If the error is equal to or larger than the minimum unit, error voltage value generation circuit 23 is controlled to generate a voltage value corresponding to the error. Circuit 23 provides the error voltage value generated based on the control of circuit 22 to addition circuit 34. Thus, register 21 is operative to modify and store each differential voltage value therein by sequentially inputting a value produced by adding the error voltage value of the differential voltage value generated by circuit 23 and the differential voltage value of each MR element. Thus, in the arrangement of operation circuit 6 shown in FIG. 4, the initialization operation in operation circuit 6 shown in FIG. 3 will not be necessary. Furthermore, since the offset voltage value in each MR element is corrected in real time, the offset voltage value can be corrected for use corresponding to change of the heads with time.

Figure 5:
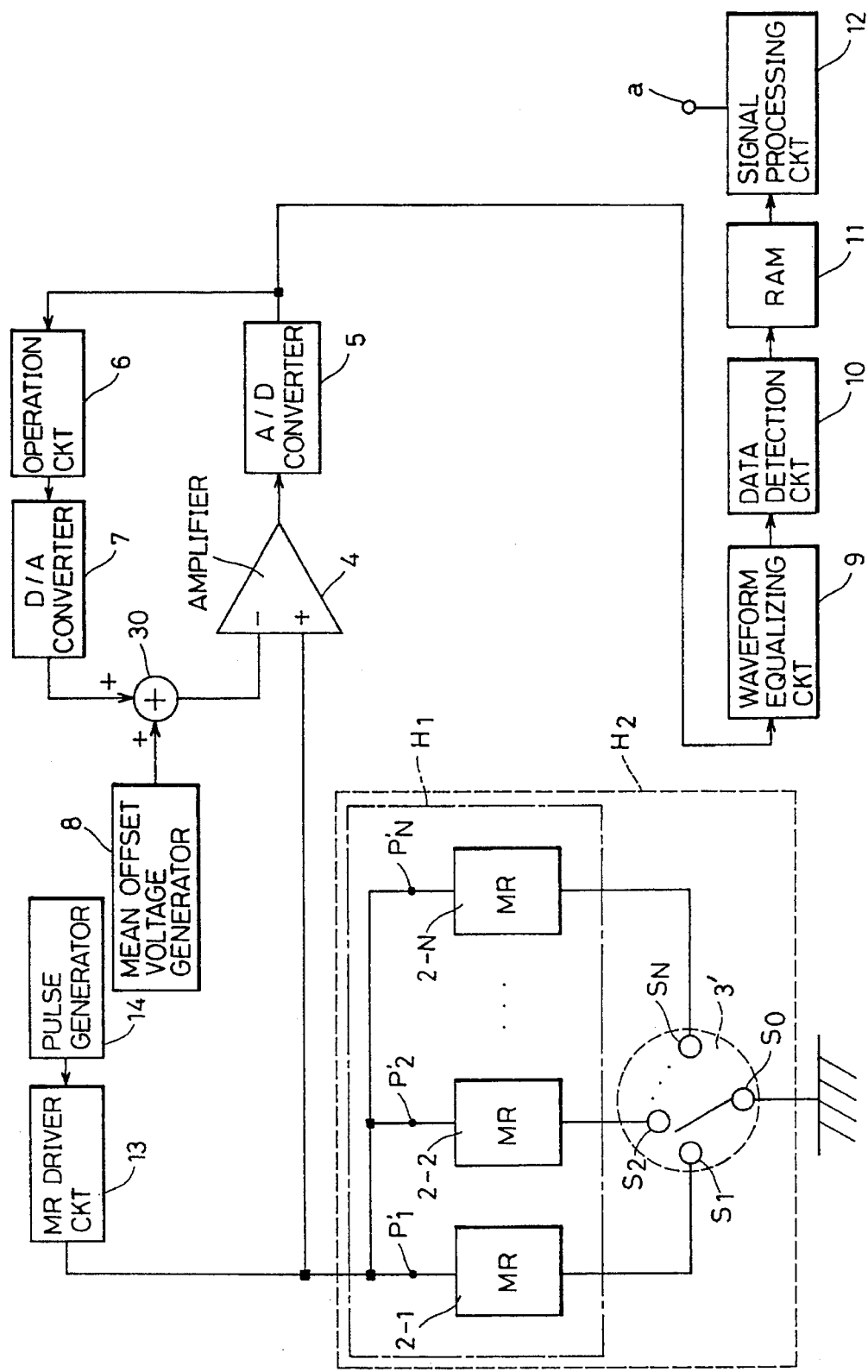
FIG. 5 is a block diagram showing a multi-track magnetic signal reproducing apparatus according to a second embodiment of the invention.

FIG. 5 is a block diagram showing a multi-track magnetic signal reproducing apparatus according to a second embodiment of the invention. The apparatus shown in FIG. 5 is the same as that shown in FIG. 1 except that constant current power supply 1 shown in FIG. 1 is replaced with an MR driver circuit 13 and a pulse generator 14, and therefore a detailed description thereof is omitted here.

In the first embodiment shown in FIG. 1, constant current from constant current power supply 1 is supplied as pulse current to each MR element by the switching operation of switch 3, while in the second embodiment shown in FIG. 5, pulse current is supplied to each MR element by the function of MR driver circuit 13 and pulse generator 14. In the apparatus in FIG. 1, the duty ratio of the pulse current is 1/N, and is uniformly determined depending upon the value of N, while in the second embodiment shown in FIG. 5, pulse current in shorter width than time interval for switching current is supplied to each MR element in synchronization with the side to supply current being sequentially switched by switch 3', and therefore the duty ratio of pulse current can further be reduced. ($P_1'$) to ($P_N'$) in FIG. 2 represent the waveforms of pulse current at nodes $P_1'$ to $P_N'$ in FIG. 5. Accordingly, in the second embodiment shown in FIG. 5, the amount of current supplied to each MR element can further be reduced.

Now, the number of terminals necessary for the multi-track MR head will be described.

In the first embodiment shown in FIG. 1 and the second embodiment shown in FIG. 5, for the terminals of the multi-track MR head surrounded by dotted line H1, there are terminal used both for supplying current to each MR element and for connection with differential amplifier 4, and a terminal for connecting each MR element and switch 3(3'), in other words N+1 terminals in total will be necessary. When the multi-track MR head within dotted line H1 is manufactured into an IC, by forming switch 3(3') on the same substrate on which the multi-track MR head is provided so as to have switch 3(3') built in the multi-track MR head the number of terminals is reduced. In FIGS. 1 and 5, the portion surrounded by dotted line H2 indicates the multi-track MR head having switch 3(3') built in. Generally, the multi-track MR head is manufactured through a process very-similar to a process of manufacturing semiconductor, and therefore a semiconductor element such as analog switch can readily be formed on the same substrate as the multi-track MR head is. In recent years, a method of manufacturing very small mechanical components by means of a semiconductor manufacturing process has been developed, and using such a method permits a relay substituting switch 3(3') to be readily formed on the same substrate as the multi-track MR head is.

Figure 6:
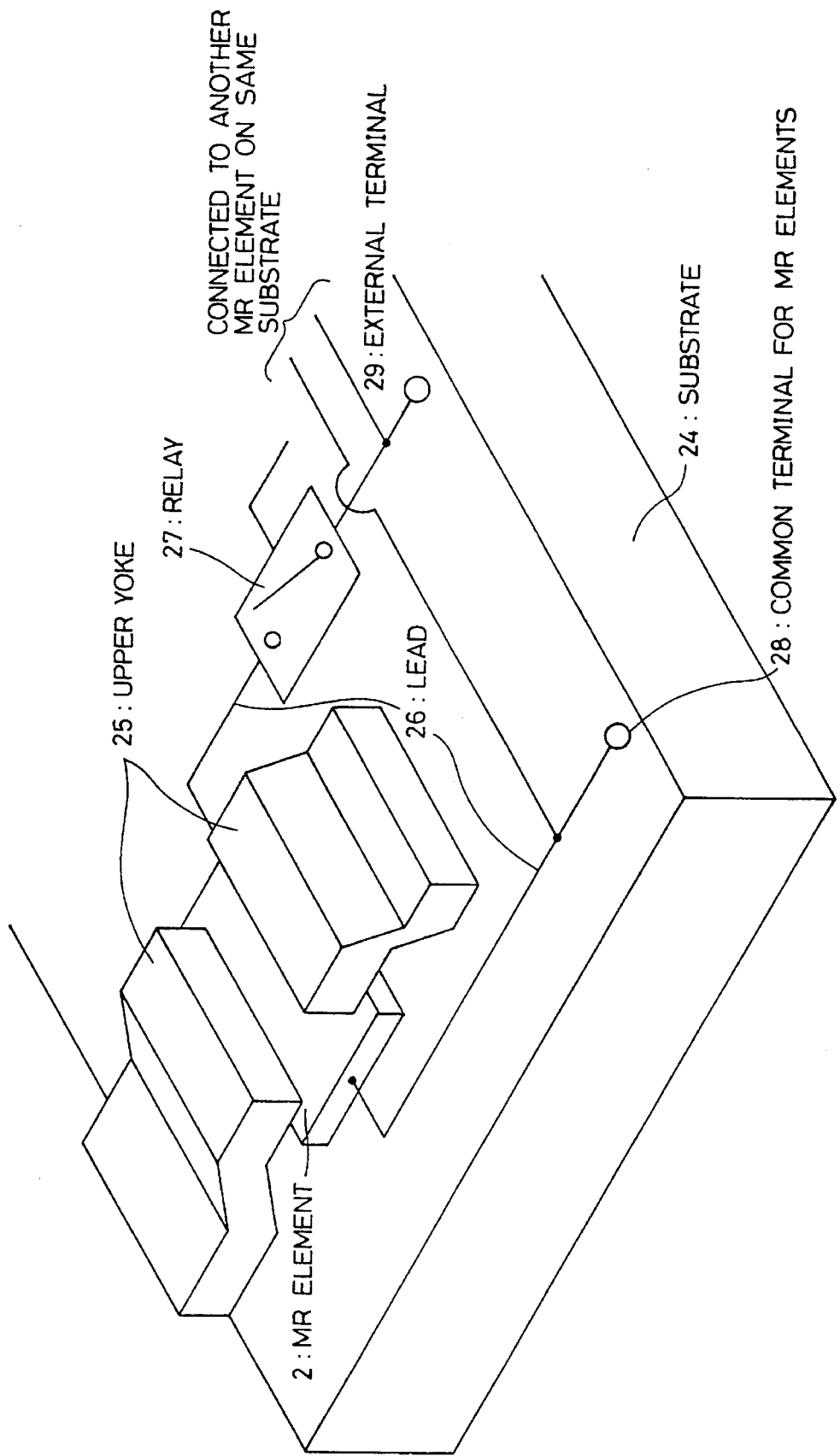
FIG. 6 is a view schematically showing the structure of a multi-track MR head for one track having a built-in switch according to the embodiment of the invention.

FIG. 6 schematically illustrates the structure of a multi-track MR head having a built-in switch for one track. In FIG. 6, provided on a main surface of the substrate 24 of the circuit are an MR element 2, an upper yoke 25, a lead 26 connected to MR element 2, a relay (or analog switch) 27, a common terminal for MR elements and an external terminal 29 for relay 27. Terminal 28 is connected through the lead to another MR element on substrate 24 which is not shown, and related to a plurality of MR elements on the same substrate. External terminal 29 in FIG. 6 is grounded as illustrated in FIG. 1 and therefore can function as a common terminal in the head. Accordingly, for the terminals of the multi-track MR head surrounded by dotted line H2 in FIGS. 1 and 5 having relay 27 built in, a terminal connecting a current power supply and a differential amplifier, a ground terminal, and control terminals for controlling ON/OFF of relay 27 will be necessary. When the number of control terminals related to relay 27 is S, $2^{S-1} < N \leq 2^S$ is established. Therefore, for the terminals of the multi-track MR head surrounded by dotted line H2, S+2 will be necessary in total and current can be supplied to an arbitrary MR element in the multi-track MR head surrounded by dotted line H2 with S+2 terminals.

As described above, in the multi-track MR heads in the first and second embodiments, since current is supplied sequentially and selectively to each MR element in a predetermined order, only two control terminals are necessary rather than S control terminals. More specifically, they are a terminal for supplying a clock signal indicating a timing for switching supply of current to each MR element and a terminal for inputting a synchronizing signal for synchronizing an MR element supplied with current with the other circuits (differential amplifier 4, A/D converter 5, operation circuit 6, D/A converter 7, mean offset voltage generator 8, waveform equalizing circuit 9 and the like). The multi-track MR head surrounded by dotted line H2 and having relay 27 built in needs only four terminals in total, i.e. two control terminals for inputting the synchronizing signal and clock signal described above, a terminal connected to current power supply and differential amplifier 4, and a ground terminal.

When the multi-track MR head surrounded by dotted line H1 in FIG. 1 is implemented with switch 3, constant current power supply 1 and differential amplifier 4 manufactured into an IC, a terminal functioning both for supplying current from constant current power supply 1 and as one input of differential amplifier 4, the other input terminal of differential amplifier 4, an output terminal of differential amplifier 4, a terminal connecting each MR element and switch 3, a power supply terminal, a ground terminal and the like will be necessary. Herein when the number of terminals such as power supply terminal and ground terminal is α, the number of terminals for the IC will be N+3+α in total.

When the multi-track MR head surrounded by dotted line H2 in FIG. 1 is implemented, for the terminals of constant current source 1 and differential amplifier 4 manufactured into an IC, a terminal used both for supplying current from constant current power supply 1 and as one input of differential amplifier 4, the other input terminal of differential amplifier 4, an output terminal of differential amplifier 4, and the above-described two control terminals, a power supply terminal, a ground terminal and the like are included. Accordingly, the number of terminals for the IC will be 5+α in total. Note that the number of terminals for the IC in the second embodiment shown in FIG. 5 is the same as that in the first embodiment shown in FIG. 1.

Figures 7, 8:
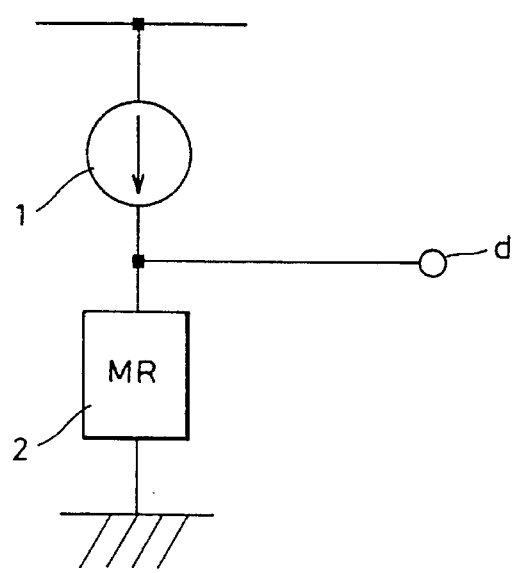
FIG. 7 is a table comparing the number of terminals for a multi-track MR head between conventional examples and the embodiment.
FIG. 8 is a diagram showing one example of the block arrangement for use in illustration of the principles of magnetic signal reproducing using an MR element.
Figure 9:
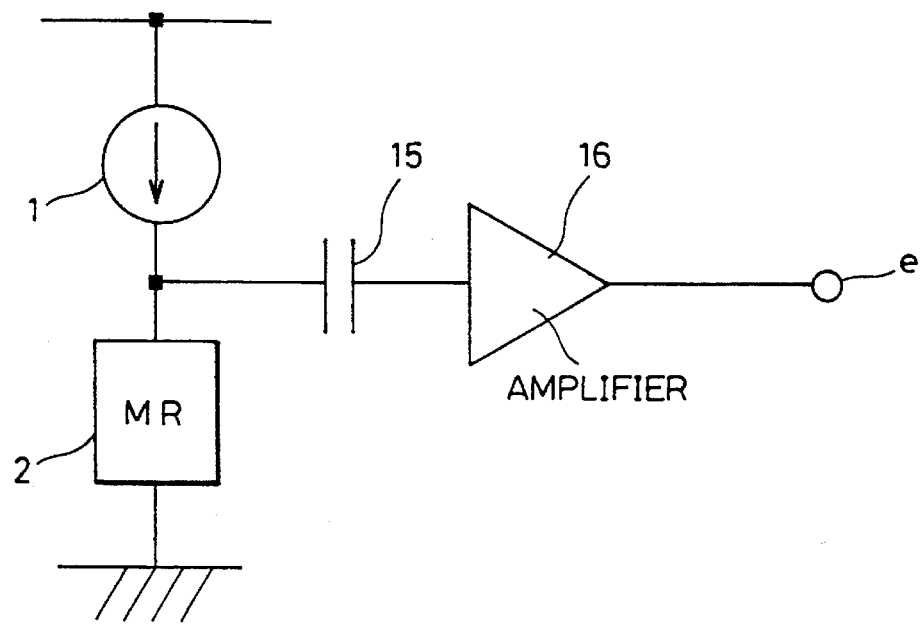
FIG. 9 is another example of the block arrangement for use in illustration of the principles of magnetic signal reproducing using an MR element.
Figure 10:
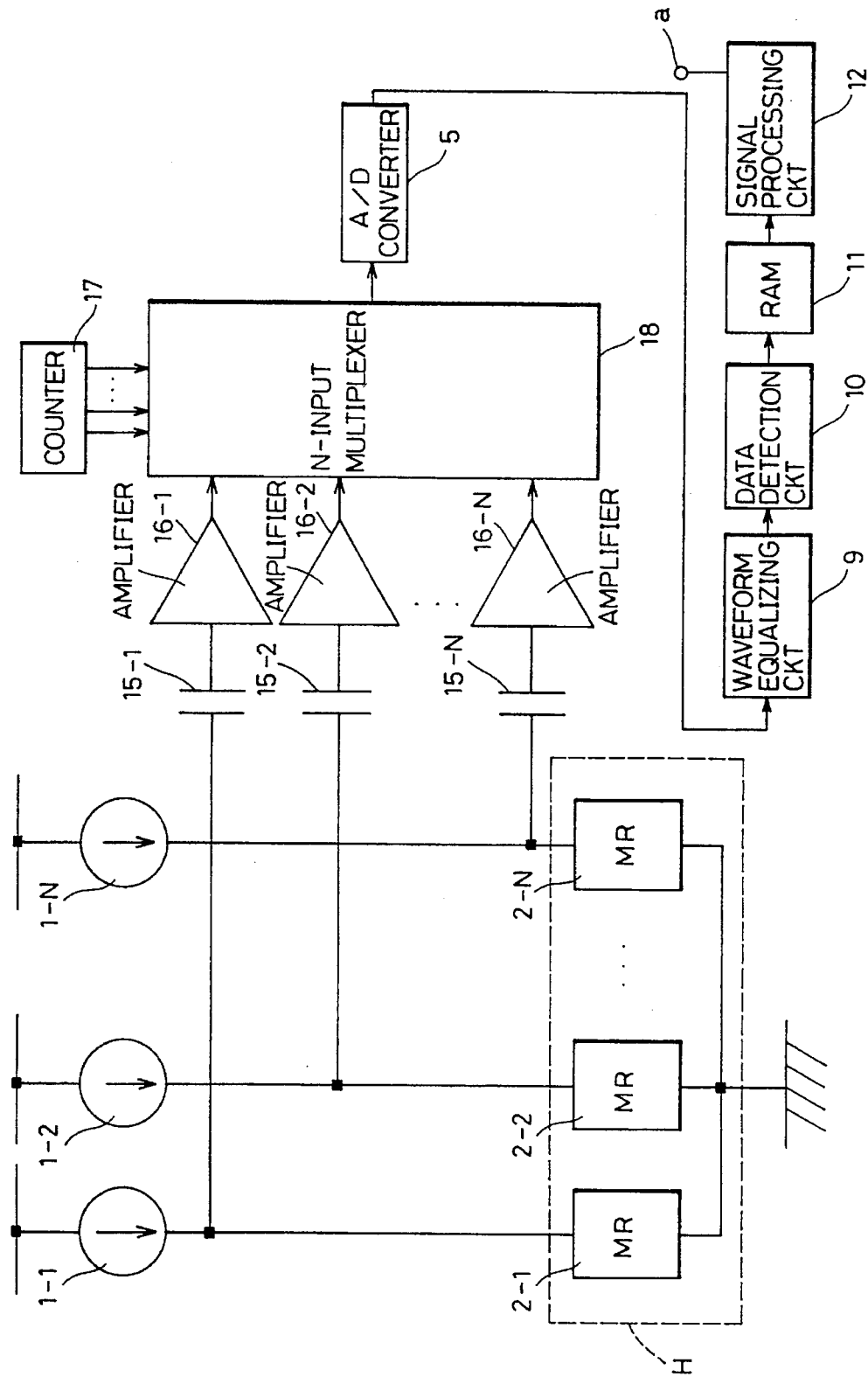
FIG. 10 is a diagram showing one example of the block arrangement of a conventional multi-track magnetic signal reproducing apparatus.
Figure 11:
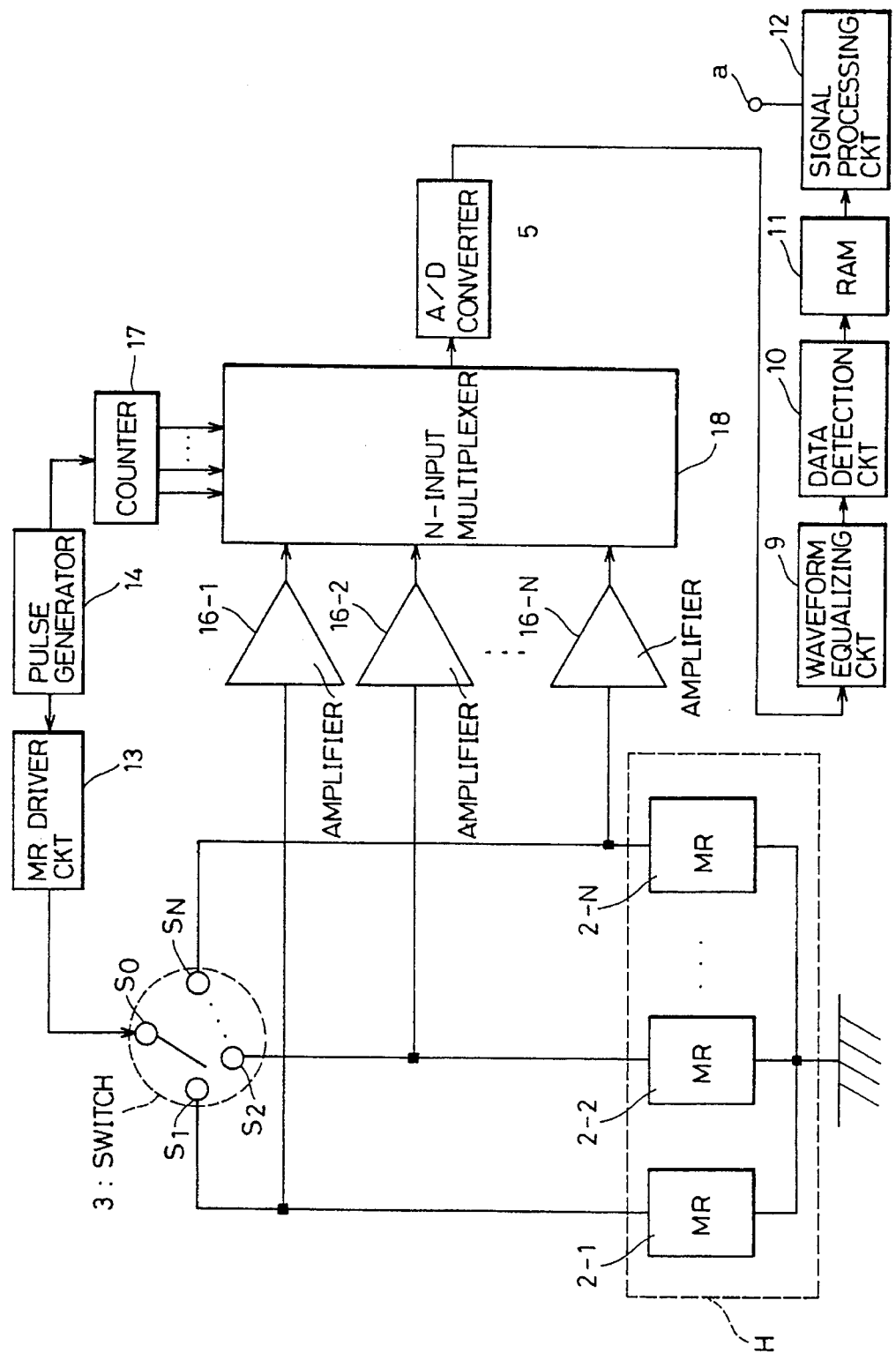
FIG. 11 is a diagram showing another example of the block arrangement of a conventional multi-track magnetic signal reproducing apparatus.

The number of terminals for multi-track MR head and the number of terminals for current power supply, differential amplifier 4, and switch 3 manufactured into an IC in the conventional example and each embodiment of the invention are set forth in FIG. 7 in table. In the column of the embodiments in FIG. 7, the cases of the multi-track MR head surrounded by dotted line H1 are set forth, and the number of terminals for the cases of the multi-track MR head surrounded by dotted line H2 are set forth in the first embodiment in FIG. 1 and the second embodiment in FIG. 5. Note that FIG. 7 illustrates the cases in which the number of heads (the number of tracks) N are 4, 8, and 16. As can be seen from FIG. 7, when comparing the conventional example and the embodiments of the invention, the multi-track MR head in Conventional Examples 1 and 2 require (N+1) terminals, while the multi-track MR head surrounded by dotted line H2 in the embodiments of the invention need only 4 regardless of the number of N. The number of terminals for each IC greatly increases as a function of the number of N in Conventional Examples 1 and 2, while in the multi-track MR head surrounded by dotted line H1 in the embodiments of the invention, the number of terminals for each IC is restrained from greatly increasing even if N increases, and the multi-track MR head surrounded by dotted line H2 need only 5+α terminals regardless of the number of N. As generally well known, as the number of terminals for a multi-track MR head and an IC is smaller, connection between the multi-track MR head and the IC will be easier, and therefore the embodiments of the invention greatly simplifies such connection, thus permitting a multi-track magnetic signal reproducing apparatus to be manufactured less costly and easily.

As in the foregoing, according to the embodiments of the invention, since pulse current is supplied to each MR element, rapid increase in current supplied to the MR element can be suppressed even if the number of tracks increases. Furthermore, an offset voltage signal can readily and accurately be removed from a voltage signal output from each MR element without using a capacitor, and only a magnetic signal component can be extracted.

Since a plurality of MR elements and a switch can be formed on the same substrate, and for the plurality of MR elements, in other words for all the tracks, only one of each of a current power supply and a differential amplifier for extracting a magnetic signal is necessary, the manufacturing cost associated with the apparatus can be reduced.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A multi-track magnetic signal reproducing apparatus, comprising:

a plurality of heads provided corresponding to a plurality of tracks on a magnetic medium and including a magneto resistance effect element in each of the tracks for reproducing magnetic signals recorded on said magnetic medium;

pulse current supply means for sequentially supplying current to each said magnetic resistance effect element in a pulsed time division manner;

DC offset voltage signal generation means for generating a DC offset voltage signal to be output from each said magneto resistance effect element, said DC offset voltage corresponding to a DC offset voltage produced by a product of a resistance value of each magneto resistance effect element in the absence of an external magnetic field for each magneto resistance effect element and current supplied by said current supply means;

magnetic signal component extraction means for sequentially extracting a magnetic signal component reproduced from each said track based on a voltage signal output from each said magneto resistance effect element in response to the sequential time division supply of current by said current supply means and the DC offset voltage signal generated by said DC offset voltage signal generation means to produce a sequential time division output from each said magneto resistance effect element corresponding to the magnetic signals recorded on each track of the magnetic medium; and wherein said magnetic signal component extraction means includes magnetic signal component calculation means for calculating the difference between a signal output from said track and an output signal from said DC offset voltage signal generation means in response to current supplied from said current supply means.

2. A multi-track magnetic signal reproducing apparatus as recited in claim 1, wherein said pulse current supply means includes, constant current source means for outputting constant current, and control switching means for controlling said constant current to be sequentially supplied from said constant current source means to each said magneto resistance effect element in said pulsed time division manner.

3. A multi-track magnetic signal reproducing apparatus as recited in claim 1, wherein said pulse current supply means includes, pulse current output means for outputting the pulse current in a prescribed cycle, and control switching means for controlling the pulse current output from said pulse current output means so as to be sequentially supplied to each said magneto resistance effect element.

4. A multi-track magnetic signal reproducing apparatus as recited in claim 3, wherein, said control switching means controls the pulse current output from said pulse current output means to be sequentially supplied to each said magneto resistance effect element while changing its duty ratio.

5. A multi-track magnetic signal reproducing apparatus as recited in claim 1, wherein said DC offset voltage signal generation means includes, operation/storage means for determining a difference between the voltage signal output from each said magneto resistance effect element and a voltage signal at a prescribed level and storing the difference as a differential voltage signal for each said magneto resistance effect element at the time of initializing said multi-track magnetic signal reproducing apparatus; and means for adding said voltage signal at said prescribed level and the differential voltage signal of each said magneto resistance effect element read out from said operation/storage means and generating a DC offset voltage signal at the time of reproducing said magnetic signal for each track.

6. A multi-track magnetic signal reproducing apparatus as recited in claim 5, wherein said operation/storage means operates so as to remove a noise component from said differential voltage signal.

7. A multi-track magnetic signal reproducing apparatus as recited in claim 1, wherein said DC offset voltage signal generation means generates the DC offset voltage signal while correcting the DC offset voltage signal output from each said magneto resistance effect element using a corresponding DC error for each said magneto resistance effect element, when the magnetic signal recorded on said magnetic medium using a modulation system according to which a DC component does not appear on the frequency spectrum is reproduced.

8. A multi-track magnetic signal reproducing apparatus as recited in claim 7, wherein said DC offset error corresponding to each said magneto resistance effect element is sequentially calculated at the time of reproduction.

9. A multi-track magnetic signal reproducing apparatus as recited in claim 1, wherein said magnetic signal component extraction means includes magnetic signal component operation means for inputting and operating on the voltage signal output from each said magneto resistance effect element in response to a supply of current by said pulse current supply means and the DC offset voltage signal of each said magneto resistance effect element generated by said DC offset voltage signal generation means, thereby calculating for each track a magnetic signal component reproduced from each said track.

10. A multi-track magnetic signal reproducing apparatus as recited in claim 5, wherein said magnetic signal component extraction means includes magnetic signal component operating means for inputting and operating the on voltage signal output from each said magneto resistance effect element in response to a supply of current by said pulse current supply means and the DC offset voltage signal of each said magneto resistance effect element generated by said DC offset voltage signal generation means, thereby calculating for each track a magnetic signal component reproduced from each said track.

11. A multi-track magnetic signal reproducing apparatus as recited in claim 7, wherein said magnetic signal component extraction means includes magnetic signal component operation means for inputting and operating on the voltage signal output from each said magneto resistance effect element in response to a supply of current by said pulse current supply means and the DC offset voltage signal of each said magneto resistance effect element generated by said DC offset voltage signal generation means, thereby calculating for each track a magnetic signal component reproduced from each said track.

12. A multi-track magnetic signal reproducing apparatus as recited in claim 9, wherein said magnetic signal component operation means inputs the voltage signal output from each said magneto resistance effect element in response to a supply of current by said pulse current supply means and the DC offset voltage signal of each said magneto resistance effect element generated by said DC offset voltage signal generation means, and calculates a difference between them.

13. A multi-track magnetic signal reproducing apparatus as recited in claim 10, wherein said magnetic signal component operation means inputs the voltage signal output from each said magneto resistance effect element in response to a supply of current by said pulse current supply means and the DC offset voltage signal of each said magneto resistance effect element generated by said DC offset voltage signal generation means, and calculates a difference between them.

14. A multi-track magnetic signal reproducing apparatus as recited in claim 11, wherein said magnetic signal component operation means inputs the voltage signal output from each said magneto resistance effect element in response to a supply of current by said pulse current supply means and the DC offset voltage signal of each said magneto resistance effect element generated by said DC offset voltage signal generation means, and calculates a difference between them.

15. A multi-track magnetic signal reproducing apparatus as recited in claim 12, wherein said magnetic signal component operation means includes differential amplifying means.

16. A multi-track magnetic signal reproducing apparatus as recited in claim 13, wherein said magnetic signal component operation means includes differential amplifying means.

17. A multi-track magnetic signal reproducing apparatus as recited in claim 14, wherein said magnetic signal component operation means includes differential amplifying means.

18. A multi-track magnetic signal reproducing apparatus as recited in claim 2, wherein said plurality of magneto resistance effect elements and said control switching means are formed on the same substrate.

19. A multi-track magnetic signal reproducing apparatus as recited in claim 3, wherein said plurality of magneto resistance effect elements and said control switching means are formed on the same substrate.

20. A multi-track magnetic signal reproducing apparatus as recited in claim 4, wherein said plurality of magneto resistance effect elements and said control switching means are formed on the same substrate.

21. A multi-track magnetic signal reproducing apparatus, comprising:

a plurality of heads provided corresponding to a plurality of tracks on a magnetic recording medium and including a magneto resistance effect element in each of the tracks for reproducing magnetic signals recorded on said magnetic medium, wherein an end of at least two heads are connected to a common output terminal;

current supply means for supplying pulse current to each said head so that an output signal from said common output terminal becomes a time divided signal;

DC offset voltage signal generation means for generating a time divided DC offset voltage signal, said DC offset voltage corresponding to a DC offset voltage produced by a product of a resistance value of each magneto resistance effect element in the absence of an external magnetic field for each magneto resistance effect element and current supplied by said current supply means;

magnetic signal component extraction means for extracting a magnetic signal reproducing signal from each head by removing said DC offset voltage at each head by using the difference between the time divided signal output from said common output terminal and an output signal from said DC offset voltage signal generation means; and wherein said magnetic signal component extraction means includes magnetic signal component calculation means for calculating the difference between a signal output from said head and an output signal from said DC offset voltage signal generation means in response to current supplied from said current supply means.

22. A multi-track magnetic signal reproducing apparatus according to claim 21, wherein said current supply means comprises constant current means connected to said common output terminal; and current control means connected to another end of said heads for controlling current in a manner that the pulse current is provided to each said head in accordance with prescribed frequency and order.

23. A multi-track magnetic signal reproducing apparatus according to claim 21, wherein said current supply means comprising:

pulse current means connected to said common output terminal for generating pulse current whose pulse width is shorter than a prescribed frequency; and current control means connected between another end of each head and said common output terminal for controlling current in a manner that pulse current is supplied in accordance with a prescribed frequency to each head.

24. A multi-track magnetic signal reproducing apparatus according to claim 21, wherein said DC offset voltage signal generation means includes a means for calculating a differential value of the DC offset voltage signal and a storing means for storing the differential value wherein the differential value is the difference between the output signal from each head and a preset reference voltage signal for each head at the time of initialization of said multi-track magnetic signal reproducing apparatus prior to reproducing magnetic signals recorded on the magnetic medium; and a generation means for generating the sum of said differential value and the preset reference voltage signal and for generating the DC offset voltage signal corresponding to DC offset voltage output from each said magneto resistance effect element during the reproduction of magnetic signals recorded on the magnetic medium.

25. A multi-track magnetic signal reproducing apparatus according to claim 24, wherein the means for calculating includes filter means for removing noise components from the differential value between an output signal from each said head and the preset reference voltage signal.

26. A multi-track magnetic signal reproducing apparatus according to claim 21, wherein said DC offset voltage signal generation means includes filter means for removing high frequency components from an output signal of said magnetic signal extracting means when magnetic signals are reproduced and the magnetic signals were recorded on the plurality of tracks of said magnetic recording medium using a modulation system wherein no DC component appears in the frequency spectrum; and means responsive to the filter means for generating the DC offset voltage signal output from said magneto resistance effect elements at the time of reproducing the magnetic signals recorded on the magnetic medium.

27. A multi-track magnetic signal reproducing apparatus according to claim 26, wherein an output signal of said filter means is a DC offset error signal; and said DC offset voltage generation means includes means for adding said DC offset error signal and a preset reference voltage signal.

* * * * *